United States Patent
Contreras

(10) Patent No.: US 10,858,572 B2
(45) Date of Patent: Dec. 8, 2020

(54) MATERIAL DESIGN FOR THE ENCAPSULATION OF ADDITIVES AND RELEASE

(71) Applicant: SAUDI ARABIAN OIL COMPANY, Dhahran (SA)

(72) Inventor: Elizabeth Q. Contreras, Houston, TX (US)

(73) Assignee: SAUDI ARABIAN OIL COMPANY

(*) Notice: Subject to any disclaimer, the term of this patent is extended or adjusted under 35 U.S.C. 154(b) by 0 days.

(21) Appl. No.: 16/807,332

(22) Filed: Mar. 3, 2020

(65) Prior Publication Data

US 2020/0199434 A1   Jun. 25, 2020

Related U.S. Application Data

(62) Division of application No. 16/230,391, filed on Dec. 21, 2018, now Pat. No. 10,619,085.

(Continued)

(51) Int. Cl.
| | |
|---|---|
| *C09K 8/487* | (2006.01) |
| *C09K 8/493* | (2006.01) |
| *C09K 8/467* | (2006.01) |
| *C04B 20/10* | (2006.01) |
| *C04B 28/02* | (2006.01) |

(Continued)

(52) U.S. Cl.
CPC .......... *C09K 8/487* (2013.01); *C04B 20/1037* (2013.01); *C04B 28/02* (2013.01); *C09K 8/467* (2013.01); *C09K 8/493* (2013.01); *C04B 24/121* (2013.01); *C04B 24/287* (2013.01);

(Continued)

(58) Field of Classification Search
CPC ........ C09K 8/487; C09K 8/467; C09K 8/493; C04B 20/1037; C04B 28/02; C04B 24/121; C04B 24/287; C04B 28/04; C04B 2103/0046; C04B 2103/0062
See application file for complete search history.

(56) References Cited

U.S. PATENT DOCUMENTS

| | | |
|---|---|---|
| 3,429,827 A | 2/1969 | Ruus |
| 3,511,314 A | 5/1970 | Scott et al. |
| (Continued) | | |

FOREIGN PATENT DOCUMENTS

| | | |
|---|---|---|
| CN | 104086089 A | 10/2014 |
| GB | 1229689 | 4/1971 |
| (Continued) | | |

OTHER PUBLICATIONS

International Search Report and Written Opinion for related PCT application PCT/US2017/052367 dated Jan. 9, 2018.

(Continued)

*Primary Examiner* — Silvana C Runyan
(74) *Attorney, Agent, or Firm* — Bracewell LLP; Constance Gall Rhebergen

(57) ABSTRACT

Embodiments provide a method for controlled release of a cement additive for use in a wellbore. The method includes the steps of mixing an aramide capsule with a cement slurry to form an additive-containing slurry, and introducing the additive-containing slurry into the wellbore. The aramide capsule is formed by interfacial polymerization where an aramide polymer forms a semi-permeable membrane encapsulating the cement additive.

10 Claims, 3 Drawing Sheets

Related U.S. Application Data

(60) Provisional application No. 62/612,754, filed on Jan. 2, 2018.

(51) Int. Cl.
   *C04B 28/04* (2006.01)
   *C04B 103/00* (2006.01)
   *C04B 24/12* (2006.01)
   *C04B 24/28* (2006.01)

(52) U.S. Cl.
   CPC ...... *C04B 28/04* (2013.01); *C04B 2103/0046* (2013.01); *C04B 2103/0062* (2013.01)

(56) References Cited

U.S. PATENT DOCUMENTS

| | | |
|---|---|---|
| 3,623,330 A | 11/1971 | Nakade et al. |
| 4,107,292 A | 8/1978 | Nemeth |
| 4,324,683 A | 4/1982 | Lim et al. |
| 4,632,186 A | 12/1986 | Boncan et al. |
| 5,049,167 A | 9/1991 | Castro et al. |
| 5,095,987 A | 3/1992 | Weaver et al. |
| 5,164,099 A * | 11/1992 | Gupta ............... C09K 8/62 507/214 |
| 5,211,234 A | 5/1993 | Floyd |
| 5,368,102 A * | 11/1994 | Dewprashad ....... C08G 59/18 166/276 |
| 5,437,813 A | 8/1995 | Akashi et al. |
| 5,631,559 A | 3/1997 | Dillenbeck, III |
| 5,705,233 A | 1/1998 | Denes et al. |
| 6,527,051 B1 | 3/2003 | Reddy et al. |
| 6,554,071 B1 | 4/2003 | Reddy et al. |
| 6,572,697 B2 | 6/2003 | Gleeson et al. |
| 6,645,288 B1 | 11/2003 | Dargaud et al. |
| 6,722,434 B2 | 4/2004 | Reddy et al. |
| 6,761,220 B2 | 7/2004 | Blauch et al. |
| 6,786,963 B2 | 9/2004 | Matherly et al. |
| 7,363,978 B2 | 4/2008 | Welton et al. |
| 7,476,713 B2 | 1/2009 | Hild et al. |
| 7,569,630 B2 | 8/2009 | Ma et al. |
| 7,914,884 B2 | 3/2011 | Royer et al. |
| 8,029,709 B2 | 10/2011 | Wu et al. |
| 8,251,143 B2 | 8/2012 | Drochon et al. |
| 8,383,031 B2 | 2/2013 | Naji et al. |
| 8,689,873 B2 | 4/2014 | Abad et al. |
| 8,822,386 B2 | 9/2014 | Quintero et al. |
| 8,945,279 B2 | 2/2015 | Aines et al. |
| 10,065,887 B2 | 9/2018 | Kierat et al. |
| 2004/0171499 A1 | 9/2004 | Ravi et al. |
| 2005/0203226 A1 | 9/2005 | Mader et al. |
| 2006/0052251 A1 | 3/2006 | Anderson et al. |
| 2006/0119926 A1 | 6/2006 | Liu et al. |
| 2006/0144300 A1 | 7/2006 | Touzet et al. |
| 2006/0264332 A1 | 11/2006 | Welton et al. |
| 2007/0209794 A1 | 9/2007 | Kaufman et al. |
| 2009/0062452 A1 | 3/2009 | Harder et al. |
| 2010/0025039 A1 | 2/2010 | Roddy et al. |
| 2011/0086941 A1 | 4/2011 | Therond et al. |
| 2011/0226690 A1 | 9/2011 | Kalayci |
| 2012/0165428 A1 | 6/2012 | Tilara et al. |
| 2013/0295378 A1 | 11/2013 | Bonin et al. |
| 2014/0262262 A1 | 9/2014 | Zheng et al. |
| 2015/0099674 A1 | 4/2015 | Lee et al. |
| 2015/0129207 A1 | 5/2015 | Bastuba et al. |
| 2015/0159079 A1 | 6/2015 | Huh et al. |
| 2016/0017215 A1 | 1/2016 | Al-Muntasheri et al. |
| 2016/0017688 A1 | 1/2016 | Chatterji et al. |
| 2016/0068745 A1 | 3/2016 | Conway |
| 2016/0362594 A1 | 12/2016 | Rojas et al. |
| 2017/0058191 A1 | 3/2017 | Mahoney et al. |
| 2017/0073275 A1 | 3/2017 | McDaniel et al. |
| 2017/0349805 A1 | 12/2017 | Musso et al. |
| 2018/0079947 A1 | 3/2018 | Contreras |
| 2018/0258336 A1 | 9/2018 | Contreras |
| 2019/0031951 A1 | 1/2019 | Johnson et al. |

FOREIGN PATENT DOCUMENTS

| | | |
|---|---|---|
| JP | 2004131361 A | 11/2005 |
| WO | 2014204677 A1 | 12/2014 |
| WO | 2017137789 A1 | 8/2017 |

OTHER PUBLICATIONS

The International Search Report and Written Opinion for related PCT application PCT/US2018/066996 dated Mar. 22, 2019.
The International Search Report and Written Opinion for related PCT application PCT/US2018/066998 dated Mar. 19, 2019.
E Quevedo, JL Steinbacher, DT McQuade. Interfacial polymerization within a simplified microfluidic device: capturing capsules. Journal of the American Chemical Society, 2005.
JL Steinbacher, DT McQuade. "Polymer chemistry in flow: New polymers, beads, capsules, and fibers." Journal of Polymer Science Part A: Polymer Chemistry, 2006.
N. Abatzoglou & S. Boivin. A review of biogas purification processes. Biofuels, Bioproducts and Biorefining, 3, 42-71, 2009.
SJ Broadwater, SL Roth, KE Price, M Kobašlija, DT McQuade. One-pot multi-step synthesis: a challenge spawning innovation. Organic & Biomolecular Chemistry, 2005.
Song et al., "Recent progress in interfacial polymerization", Materials Chemistry Frontiers, 2017, pp. 1028-1040, vol. 1, No. 6, The Royal Society of Chemistry and the Chinese Chemical Society.
T Tadros. Polymeric surfactants in disperse systems. Advances in Colloid and Interface Science, 2009.
X. Wang, X. Ma, X. Xu, L. Sun, & C. Song. Mesoporous-molecular-sieve-supported polymer sorbents for removing H2S from hydrogen gas streams. Topics in Catalysis, 49, 108-117, 2008.
Siefers, AM, "A novel and cost-effective hydrogen sulfide removal technology using tire derived rubber particles"; Graduate Theses and Dissertation, p. 1-93; 2010.

* cited by examiner

MATERIAL DESIGN FOR THE ENCAPSULATION OF ADDITIVES AND RELEASE

CROSS REFERENCE TO RELATED APPLICATIONS

This application is a divisional application of U.S. patent application Ser. No. 16/230,391, filed on Dec. 21, 2018, issued as U.S. Pat. No. 10,619,085, which claims the benefit of and priority to U.S. Provisional Patent Application No. 62/612,754, filed on Jan. 2, 2018; the disclosures of which are incorporated herein by reference in their entireties.

BACKGROUND

1. Technical Field

Disclosed are compositions and methods for use with cement. Specifically, disclosed are compositions and methods for controlling a downhole environment during cement operations.

2. Related Art

In many wellbores, cement can be used to form a layer between a casing and the formation. Delivery of additives to the cement can be problematic for a variety of reasons. First, the additives must be mixed with the cement slurry and delivered along with the slurry to the downhole location. Second, the additives must survive intact at the extreme downhole conditions in order to impart their additive properties. Third, controlling the release rate of an additive can be difficult in a downhole environment.

Encapsulation-based systems are of interest in the oil and gas industry in applications such as chemical additive preservation, small molecule release, particle delivery, and self-sealing materials. Many methods are used to encapsulate relevant chemical additives for the controlled release of contents. Example capsulation materials include polymeric coatings, inorganic shells, and mesoporous materials.

When placing cement in a wellbore, a multitude of additives (usually in large quantities) are considered and added to the slurry in order to meet a variety of functional needs suitable for diverse wellbore conditions. However, using large quantities of certain additives (for example, retarders and fluid loss control agents) may destabilize the slurry at the surface even before introducing the slurry into the wellbore.

SUMMARY

Disclosed are compositions and methods for use in cement slurries. Specifically, disclosed are compositions and methods for controlling a downhole environment during cement operations.

Embodiments provide a system for the controlled release of encapsulated cargo that utilizes engineered features of permeable polymeric shell walls. Using vesicles or capsules, cement additives can be delivered without physical or chemical modification. Various cement formulations can be designed utilizing numerous combinations of vesicles with various encapsulants. Vesicle systems are particularly useful for delivering agents such as chemical additives and small molecules to provide beneficial interactions in cement slurry applications. Such cement slurry applications include chemical delivery and controlled release of chemical additives during placement of a slurry downhole.

In a first aspect, a method for encapsulating a cement additive for use in a wellbore includes the step of mixing a continuous solvent and a surfactant to produce a continuous phase. The method includes the step of mixing a dispersed solvent, a dispersed monomer, and the cement additive to produce a dispersed phase. The dispersed solvent and the continuous solvent are immiscible. The method includes the step of mixing the continuous phase and the dispersed phase to form a mixture having an emulsion such that the dispersed phase is dispersed as droplets in the continuous phase. An interface defines the droplets of the dispersed phase dispersed in the continuous phase. The method includes the step of adding a crosslinker to the mixture. The method includes the step of allowing an aramide polymer to form on the interface of the droplets, such that the aramide polymer forms a semi-permeable membrane around a core. The core contains the dispersed phase, such that the semi-permeable membrane around the core forms the aramide capsule. The method includes the step of allowing the aramide capsule to settle from the mixture. The method includes the step of separating the aramide capsule from the mixture using a separation method.

In certain aspects, the dispersed solvent can include water, ethanol, and methanol. In certain aspects, the dispersed monomer includes an amine group. In certain aspects, the dispersed monomer can include ethylenediamine, meta-phenylenediamine, para-phenylenediamine, and hexamethylenediamine. In certain aspects, the continuous solvent can include oil, mineral oil, cyclohexane, and chloroform. In certain aspects, the crosslinker can include 1,3,5-benzenetricarbonyl trichloride and sebacoyl chloride. In certain aspects, the cement additive is water-soluble and can include sealing reagents, anti-gas migration additives, high-temperature retarders, fluid-loss additives, accelerators, and superplasticizers.

In a second aspect, a method for controlled release of a cement additive for use in a wellbore includes the step of mixing an aramide capsule with a cement slurry to form an additive-containing slurry. The method includes the step of introducing the additive-containing slurry into the wellbore. The aramide capsule is formed by the step of mixing a continuous solvent and a surfactant to produce a continuous phase. The aramide capsule is formed by the step of mixing a dispersed solvent, a dispersed monomer, and the cement additive to produce a dispersed phase. The dispersed solvent and the continuous solvent are immiscible. The aramide capsule is formed by the step of mixing the continuous phase and the dispersed phase to form a mixture having an emulsion such that the dispersed phase is dispersed as droplets in the continuous phase. An interface defines the droplets of the dispersed phase dispersed in the continuous phase. The aramide capsule is formed by the step of adding a crosslinker to the mixture. The aramide capsule is formed by the step of allowing an aramide polymer to form on the interface of the droplets, such that the aramide polymer forms a semi-permeable membrane around a core. The core contains the dispersed phase, such that the semi-permeable membrane around the core forms the aramide capsule. The aramide capsule is formed by the step of allowing the aramide capsule to settle from the mixture. The aramide capsule is formed by the step of separating the aramide capsule from the mixture using a separation method.

In certain aspects, the method further includes the step of allowing the cement additive to permeate from the core through the semi-permeable membrane to the cement slurry.

The method further includes the step of allowing the cement additive to have a beneficial interaction with the cement slurry. In certain aspects, the method further includes the step of allowing the additive-containing slurry to set to form a hardened cement. The aramide capsule is embedded in the hardened cement. The method further includes the step of allowing the cement additive to permeate from the core through the semi-permeable membrane to the hardened cement. The method further includes the step of allowing the cement additive to have a beneficial interaction with the hardened cement. In certain aspects, the hardened cement has an unconfined compression strength ranging from about 3,000 pounds per square inch (psi) to about 3,400 psi. In certain aspects, the method further includes the step of allowing the additive-containing slurry to set to form a hardened cement. The aramide capsule is embedded in the hardened cement. The method further includes the step of allowing the semi-permeable membrane to burst such that the cement additive is released from the aramide capsule and migrates through the hardened cement. The method further includes the step of allowing the cement additive to have a beneficial interaction with the hardened cement. In certain aspects, the hardened cement has an unconfined compression strength ranging from about 3,000 psi to about 3,400 psi.

In certain aspects, the dispersed solvent can include water, ethanol, and methanol. In certain aspects, the dispersed monomer includes an amine group. In certain aspects, the dispersed monomer can include ethylenediamine, meta-phenylenediamine, para-phenylenediamine, and hexamethylenediamine. In certain aspects, the continuous solvent can include oil, mineral oil, cyclohexane, and chloroform. In certain aspects, the crosslinker can include 1,3,5-benzenetricarbonyl trichloride and sebacoyl chloride. In certain aspects, the cement additive is water-soluble and can include sealing reagents, anti-gas migration additives, high-temperature retarders, fluid-loss additives, accelerators, and superplasticizers. In certain aspects, the aramide polymer of the aramide capsule is present in the additive-containing slurry at a concentration of at least about 3% by weight of cement. In certain aspects, the cement additive is tethered in the core of the aramide capsule via site-isolation of a water-soluble polymer.

In a third aspect, an aramide capsule for use in a cement environment includes a semi-permeable membrane including an aramide polymer. The semi-permeable membrane forms a shell with a core, such that the core contains a cement additive. The semi-permeable membrane is operable to allow the cement additive to permeate from the core through the semi-permeable membrane to the cement environment. The aramide capsule includes the cement additive. The cement additive is operable to impart a beneficial interaction on the cement environment. The aramide polymer includes subunits derived from a monomer including a di-functional amino group and subunits derived from a crosslinker including an acyl chloride.

In certain aspects, the aramid capsule further includes a linear polymer. The linear polymer is water-soluble and is operable to tether the cement additive in the core via site-isolation. In certain aspects, the linear polymer can include polyethylene glycols, polystyrenes, polyethylene imine, polyvinyl alcohols, and polyvinylpyrrolidone. In certain aspects, the monomer can include ethylenediamine, meta-phenylenediamine, para-phenylenediamine, and hexamethylenediamine. In certain aspects, the crosslinker can include 1,3,5-benzenetricarbonyl trichloride and sebacoyl chloride. In certain aspects, the cement additive is water-soluble and can include sealing reagents, anti-gas migration additives, high-temperature retarders, fluid-loss additives, accelerators, and superplasticizers.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

Figure 1:
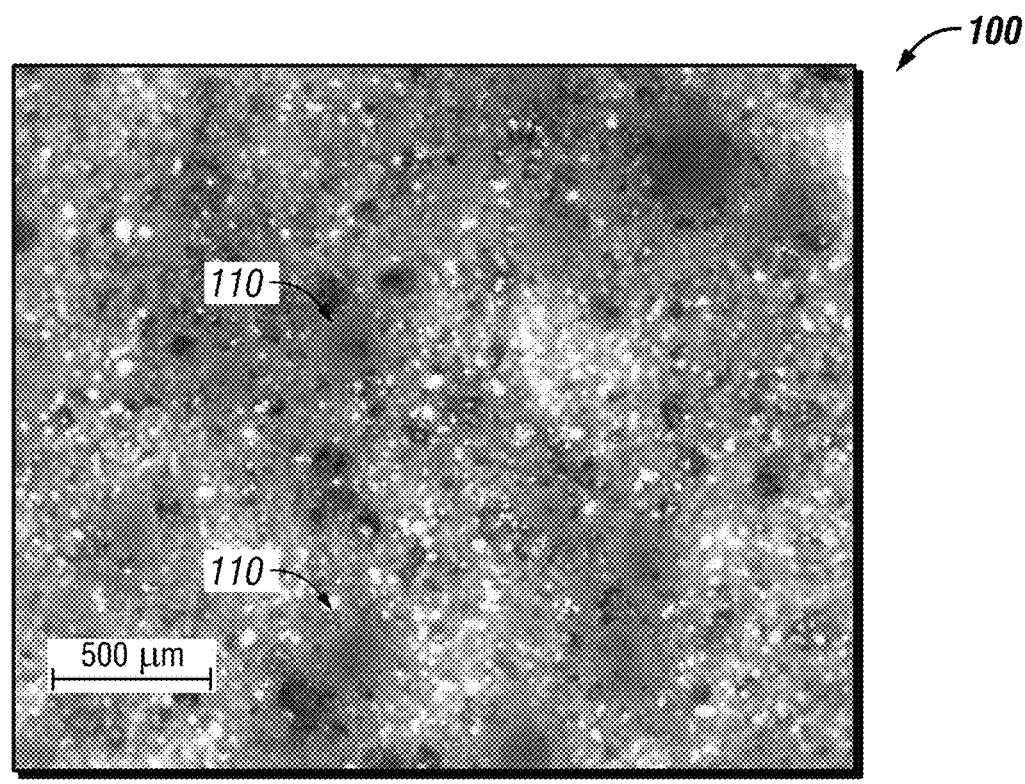
FIG. 1 is a photographic representation of the aramide capsules embedded in a cement slurry, as imaged by optical microscopy at ambient conditions.

In the accompanying Figures, similar components or features, or both, may have a similar reference label.

DETAILED DESCRIPTION

While the scope of the apparatus and method will be described with several embodiments, it is understood that one of ordinary skill in the relevant art will appreciate that many examples, variations and alterations to the apparatus and methods described here are within the scope and spirit of the embodiments.

Accordingly, the embodiments described are set forth without any loss of generality, and without imposing limitations, on the embodiments. Those of skill in the art understand that the scope includes all possible combinations and uses of particular features described in the specification.

The compositions and methods are directed to cement additive delivery systems. Advantageously, the composition and methods described here can mitigate gas migration and the formation of micro-annuli in cement slurries. Advantageously, the compositions and methods can increase the compression strength following the thickening time, decreasing the permeability of the hardened cement. Advantageously, the compositions and methods described can provide high-temperature cement additives that enable the delivery of cement additives at controlled release after a cement slurry has been placed in a wellbore.

Chemical additives are frequently used for designing cement slurry formulations to produce reliable cement sheaths for well construction. However, the chemical additives may not properly function at wellbore conditions where the extreme temperature and pressure may alter the desired chemical functionalities of the additives. Advantageously, the chemical additives (for example, a dispersant or an accelerator) can be encapsulated by methods incorporating interfacial polymerization, such that the chemical additives are placed within a hollow polymer shell and shielded from extreme wellbore conditions. The shells are designed for the delayed release of the chemical additives providing molecular and temporal control for field applications. Similar to chemical additives, interfacial polymerization can be employed for encapsulating engineered additives. The engineered additives can also be placed within the hollow polymer shell for the controlled release of the additives in the wellbore.

As used throughout, "capsule" refers to one or more particles of particular combination of semi-permeable membrane and cement additive. A reference to the singular capsule includes multiple particles. A reference to the plural capsules is a reference to compositions of different semi-permeable membranes.

As used throughout, "shell" refers to an enclosure that completely surrounds a core.

As used throughout, "semi-permeable" means that certain components are able to pass through. The ability for a component to pass through a semi-permeable membrane depends on the size and charge of the component.

As used throughout, "shearing rate" refers to the mixing speed when forming the emulsion-based capsules.

As used throughout, "beneficial interaction" means the cement additive imparts a benefit to the cement slurry or hardened cement or the properties of the cement slurry or hardened slurry. "Benefit" as used here means a positive impact. Non-limiting examples of beneficial interactions include sealing the cement to mitigate micro-annuli formation of set cements during the lifetime of the well and releasing cement additives in a controlled fashion as the slurry is mixed with the additives or as the mixed slurry is introduced downhole. Non-limiting examples of beneficial interactions also include gas migration control and enhancing mechanical properties of set cement.

As used throughout, "cement environment" refers collectively any stage of the cement process and includes both the cement slurry and the hardened cement.

As used throughout, "immiscible" means not forming a homogeneous mixture when two or more solvents are added together. Immiscible solvents may form an emulsion. Non-limiting examples of immiscible solvents include oil and water, and cyclohexane and water.

As used throughout, "wellbore" refers to a hole drilled into a subsurface formation of the earth, where the subsurface formation can contain hydrocarbons. The wellbore can have a depth from the surface and a diameter and can transverse the subsurface formation vertically, horizontally at a parallel to the surface, or at any angle between vertically and parallel.

As used throughout, "aramide" refers to an aromatic polyamide. Terms such as "aramids," "aramides," "polyaramids," "polyaramides," "aramid polymers," "aramide polymers," and "aromatic polyamides" are used interchangeably. Commercial examples of aramides include para-aramides such as Kevlar® (available from Dupont®, Wilmington, Del.), Technora® (available from Teijin Aramid USA, Inc, Conyers, Ga.), Twaron® (available from Teijin Aramid USA, Inc, Conyers, Ga.), and Heracron® (available from Kolon Industries, Inc., Gwachon, Korea), and meta-aramides such as Nomex® (available from Dupont®, Wilmington, Del.) and Teijinconex® (available from Teijin Aramid USA, Inc, Conyers, Ga.). A para-aramide is an aramide where the polymer chain is connected via the para positions of an acyl group subunit or functional group. A meta-aramide is an aramide where the polymer chain is connected via the meta positions of an acyl group subunit or functional group.

The aramide capsule can be composed of a cement additive encapsulated by a semi-permeable membrane. The aramide capsule can have a specific gravity of between 1.0 and 1.5, alternately of between 1.2 and 1.4. The specific gravity of the aramide capsule is comparable to the specific gravity of aramides.

The cement additive can be any cement additive imparting a beneficial interaction to the cement environment. Cement additives can include sealing reagents, anti-gas migration additives, accelerators, high-temperature retarders, fluid-loss additives, accelerators, superplasticizers, and combinations of the same. Sealing reagents can be any material capable of self-sealing fractured cement. Sealing reagents can include polymers, salts, rubber, water, latexes, epoxy, silicones, and combinations of the same. Sealing reagents can include a polymer with a $T_g$, that is, a glass transition temperature where polymers become soft and flowable. In cases where the cement is compromised with micro-cracks, these sealing reagents self-seal the hardened cement to increase the workable lifetime of the well. In some embodiments, the cement additive is in a free-flowing powder form and is added, either wetted or not, to the dry mix when producing a slurry formulation. In some embodiments, the cement additive is water-soluble and can be dissolved in the dispersed solvent to form a dispersed phase.

The semi-permeable membrane can be an aramide polymer that is semi-permeable. The semi-permeable membrane can be a crosslinked aramide polymer. The aramide polymer can be formed through a polycondensation reaction. The polycondensation reaction can form other polymers suitable for the semi-permeable membrane, such as polyesters, polyurethanes, and polyureas. Examples of the aramide polymer that can form the semi-permeable membrane include polyamides, aramides, and combinations of the same. The semi-permeable membrane forms a shell encapsulating a core. The core contains the cement additive. The core can be a liquid core. Advantageously, aramides have high-temperature resistance and ballistic-rated strength. The semi-permeable membrane can be heat resistant up to temperatures of 400 deg. C. The semi-permeable membrane can maintain the integrity of the cement additive, resist chemical contamination of the cement additive, and keep the cement additive from degrading in the presence of the cement slurry until desired. The semi-permeable membrane can allow the cement additive to permeate from the core to outside the cement additive capsule. The cement additive can permeate through the semi-permeable membrane via osmosis, fluid displacement, or mechanical rupture. The semi-permeable membrane provides for a controlled release rate of the cement additive. The extent of crosslinking of the aramide polymer can determine the permeability of the semi-permeable membrane. The release rate can be controlled by adjusting the permeability of the semi-permeable membrane.

The aramide capsule can be formed through the method of interfacial polymerization. In the process of interfacial polymerization two immiscible fluids, such as a continuous phase and a dispersed phase, are blended together until the dispersed phase is dispersed as droplets in the continuous phase forming an emulsion. At least one phase contains a monomer and a crosslinker can be included in the other phase and the aramide polymer can form on the interface between the dispersed droplet and the continuous phase forming a shell around the droplet of the dispersed phase, such that the dispersed phase is captured within the shell. The shell formed through interfacial polymerization is the semi-permeable membrane.

The continuous phase can include a continuous solvent and a surfactant. In at least one embodiment, the continuous phase includes a crosslinker. In at least one embodiment, the crosslinker is added after the dispersed phase and the continuous phase have been blended. The continuous solvent can be any polar or non-polar solvent immiscible with water. Non-polar solvents suitable for use as the continuous solvent include oil, mineral oil, cyclohexane, chloroform, and combinations of the same. The crosslinker can be any acyl chloride monomer. Examples of crosslinkers include 1,3,5-benzenetricarbonyl trichloride, sebacoyl chloride, and combinations of the same. The surfactant can include sorbitan esters, polyethoxylated sorbitan esters, and combinations of the same.

The dispersed phase can include a dispersed solvent, a dispersed monomer, and the cement additive. The dispersed solvent can be any aqueous solvent that is immiscible with the continuous solvent. In at least one embodiment, the dispersed solvent can include water. The dispersed monomer can be any water-soluble diamine. The dispersed monomer can be any diamine monomer including a di-functional amino group. Examples of dispersed monomers include ethylenediamine, meta-phenylenediamine, para-phenylenediamine, hexamethylenediamine, and combinations of the same. The cement additives can be heterogeneous or solubilized. The cement additives can be blended into the dispersed phase. In at least one embodiment, the cement additives can be dissolved in the dispersed solvent to form the dispersed phase. In at least one embodiment, the dispersed phase can include a metal oxide.

The continuous phase solvent and the dispersed phase solvent can be selected such that the two fluids are immiscible with each other.

The continuous monomer and the dispersed monomer can be selected together in consideration of the properties of the aramide polymer that forms the semi-permeable membrane. The continuous monomer and the dispersed monomer can be selected to produce polyamides, aramides, polyesters, polyurethanes, polyureas, and combinations of the same. In at least one embodiment, the dispersed monomer can include ethylenediamine, meta-phenylenediamine, para-phenylenediamine, and combinations of the same. The crosslinker can include 1,3,5-benzenetricarbonyl trichloride. In at least one embodiment, the dispersed monomer can include hexamethylenediamine and the crosslinker can include sebacoyl chloride.

The amount of crosslinker added to the continuous phase can control permeability of the semi-permeable membrane. More than one continuous monomers or dispersed monomers can be used to control permeability of the semi-permeable membrane.

The continuous phase and the dispersed phase are blended together until the dispersed phase is dispersed as droplets in the continuous phase forming an emulsion. Depending on the volume of each phase a water-in-oil (w/o) emulsion or an oil-in-water (o/w) emulsion can be formed. The droplets can have different shapes including spheres, rods, fibers, and combinations of the same. The size of the droplets of the dispersed phase can be between 50 nanometers (nm) and 50 microns (µm), alternately between 100 nm and 1 µm, alternately between 1 µm and 10 µm, and alternately between 10 µm and 50 µm. The size and shape of the droplets of the dispersed phase in the continuous phase can be controlled by the shearing rate, the use of laminar flow, the dispersed solvent, the density of the dispersed solvent, the rate of blending of the continuous solvents and dispersed solvent, and viscosity of the dispersed phase. In at least one embodiment, laminar flow can be used form fibers. The size of the droplets can be optimized to impart a low rheological property to the cement slurry.

In at least one embodiment, the cement additive is insoluble in water but soluble in organic solvents. The continuous phase includes water as the continuous solvent and the dispersed phase includes the organic solvent as the dispersed solvent. Mixing the two phases may form an o/w emulsion for applications in oil-based drilling fluids.

In at least one embodiment, the crosslinker is present in the continuous phase when the two phases are blended together as a mixture and the aramide polymer begins to form as the emulsion is created. In at least one embodiment, the crosslinker is added to the mixture after the emulsion of dispersed droplets in the continuous phase has been developed.

The aramide polymer forms on the interface of the dispersed droplet and the continuous phase creating the aramide capsules. The polymerization reaction occurs at room temperature. The polymerization results in a covalently bonded crosslinked aramide polymer. The mixture is stirred to enhance homogeneity of the aramide polymer. In at least one embodiment, the mixture can be stirred for a period from about 24 hours to about 72 hours. In at least one embodiment, the aramide capsules can settle to the bottom of the reactor. In a next step, the aramide capsules are separated from the liquids remaining. The separation method used to separate the aramide capsules can be any process capable of separating a liquid and leaving behind dry capsules as a free-flowing powder. Separation methods can include decantation, filtration, centrifuging, rotary evaporation, vacuum drying, oven drying, and combinations of the same. In at least one embodiment, the separation method leaves a liquid at the core, creating a liquid filled capsule. In at least one embodiment, the separation method results in desiccation of the aramide capsule removing the liquid in the core. In at least one embodiment, the dry capsules can be washed to remove any residue of the continuous phase and then dried.

Additional reagents that can be added to the continuous phase and the dispersed phase include emulsifiers and viscosifiers. In at least one embodiment, the emulsifier added to the continuous phase is sorbitan trioleate. In at least one embodiment, the emulsifier added to the dispersed phase is polyethoxylated sorbitan ester.

The aramide capsule can be used to provide beneficial interaction with the cement environment. The aramide capsule is mixed with a cement slurry to form an additive-containing slurry. In at least one embodiment, the aramide capsule can be mixed with a cement slurry according to the API RP 10-B standard. The aramide capsule can be mixed with the cement slurry as a free-flowing dry powder, as liquid-filled capsules, or as part of a liquid emulsion. The aramide capsule can be used with any type of cement slurry. In at least one embodiment, the cement in the cement slurry is hydrophilic. In at least one embodiment, the cement slurry includes a class G Portland cement. In at least one embodiment, the cement additive is present in the cement slurry at a concentration of between 0.05% by weight of cement (bwoc) and 5% bwoc. In at least one embodiment, the aramide polymer of the semi-permeable membrane is present in the cement slurry at a concentration of at least 3% bwoc. In at least one embodiment, two or more aramide capsules can be added to the cement slurry, such that two or more different cement additives are carried into the cement slurry. The aramide capsule can be mixed within the cement slurry to distribute the aramide capsule through the cement slurry. The additive-containing slurry can be introduced to the formation according to any process for placing cement in a wellbore or formation. FIG. 1 is a photographic representation of the aramide capsules embedded in a cement slurry, as imaged by optical microscopy at ambient conditions.

The cement slurry sets into a hardened cement such that the aramide capsules are embedded in the hardened cement. In some embodiments, the hardened cement including the aramide capsules exhibits an unconfined compression strength ranging from about 2,500 psi to about 3,500 psi at about 350 deg. F. for about 120 hours. In other embodiments, the hardened cement including the aramide capsules exhibits an unconfined compression strength ranging from about 2,800 psi to about 3,500 psi at about 350 deg. F. for about 120 hours. Still in other embodiments, the hardened cement including the aramide capsules exhibits an unconfined compression strength ranging from about 3,000 psi to about 3,400 psi at about 350 deg. F. for about 120 hours. For comparison, neat cement exhibits an unconfined compression strength in similar conditions ranging from about 3,000 psi to about 4,000 psi, from about 3,400 psi to about 3,700 psi, or from about 3,500 psi to about 3,600 psi. Also for comparison, latex-containing hardened cement exhibits an unconfined compression strength in similar conditions ranging from about 1,500 psi to about 2,500 psi, from about 1,800 psi to about 2,300 psi, or from about 1,900 psi to about 2,200 psi. In some embodiments, the hardened cement including the aramide capsules exhibits a confined compression strength ranging from about 5,000 psi to about 14,000 psi at room temperature. In other embodiments, the hardened cement including the aramide capsules exhibits a confined compression strength ranging from about 9,000 psi to about 12,000 psi at room temperature.

In at least one embodiment, the cement additive permeates from the core of the aramide capsule through the semi-permeable membrane to the cement environment surrounding the aramide capsule. In at least one embodiment, semi-permeable membrane of the aramide capsule can burst under the stress of the hardened cement The cement additive then migrates through the cement environment. After the cement additive leaves the aramide capsules, the remaining aramide polymer of the semi-permeable membrane can impart strengthening properties to the matrix of the hardened cement.

In at least one embodiment, the beneficial interaction of the cement additive is to seal the cement. Sealing the cement makes the cement resistant to the influx of formation gases.

In at least one embodiment, the cement additive is tethered in the core of the aramide capsule via site-isolation using a linear polymer. The cement additive can be tethered to the semi-permeable membrane, tethered within the semi-permeable membrane, or tethered onto the semi-permeable membrane. In at least one embodiment, the cement additive can be site-isolated using linear polymers, such as polyethylene glycols (PEGs), polystyrenes, polyethylene imine, polyvinyl alcohols, polyvinylpyrrolidone, and combinations of the same. These linear polymers are typically water-soluble. The side chains of these linear polymers can be designed to contain the cement additive via chelation. Non-limiting examples of tethered cement additives include salts, accelerators, and metal catalysts. In other embodiments, these linear polymers can be cleaved such that the cleaved molecules can travel through the semi-permeable membrane. For example, linear polymers having carboxylic acid groups can be cleaved such that the cleaved molecule having the carboxylic acid group may serve as a cement retarder. In some embodiments, a viscosifier can be used to site-isolate the encapsulant.

Cement ductility refers to a measure of cement reliability where cement integrity is enhanced by making cement more elastic and ductile. Advantageously, the semi-permeable membrane of the aramide capsule improves cement ductility.

In at least one embodiment, the aramide capsule is in the absence of a molecular sieve.

EXAMPLE 1

A number of samples of aramide capsules were formed according to the methods described. The continuous solvent was a 4:1 cyclohexane-chloroform blend. The surfactant was a 1.5% by volume sorbitan trioleate (Span-85®, Sigma-Aldrich®, St. Louis, Mo.). The continuous phase included the continuous solvent and the surfactant. The crosslinker was 1,3,5-benzenetricarbonyl trichloride. The dispersed solvent was water. The dispersed monomer was 1,6-diaminohexane. The cement additive was the dispersant sulfonated acetone-formaldehyde condensate (SAFC). The dispersed phase included the dispersed solvent, the dispersed monomer, and the cement additive. SAFC has a red color, and so acted as a dye or a signaling molecule in Example 1. The SAFC allowed measurements to be taken of the release rate from the capsules.

The aramide capsules were prepared at room temperature. 25 milliliters (mL) of the continuous phase was added to 3 mL of the dispersed phase. The mixture was stirred for 15 minutes forming a w/o emulsion. After 15 minutes of stirring the crosslinker was added to the mixture in an amount in milliMolars (mM) according to Table 1. For each sample, the crosslinker was added at a rate of about 1.5 mL per minute. Stirring continued while the crosslinker was being added. Stirring maintained the w/o emulsion.

TABLE 1

| Sample | Amount of Crosslinker (mM) |
|---|---|
| A | 23 |
| B | 46 |
| C | 77 |
| D | 154 |

After 20 minutes, polymerization was stopped by filtering the solid aramide capsules. The aramide capsules were washed with 500 mL of a sodium bicarbonate buffer solution (1% weight per volume (w/v), pH~8.3). The washed aramide capsules were vacuum dried.

The aramide capsules were placed onto a microscope slide and placed under an optical microscope with a mounted digital camera and a power source. FIG. 1 shows an optical micrograph image 100 of the aramide capsules 110 containing the SAFC encapsulant.

EXAMPLE 2

Polymerization of each sample formed in Example 1 was stopped at predetermined intervals by filtering the solid aramide capsules. Each aramide capsule sample was subjected to a multi-wash process. Each sample was washed with diethyl ether then washed with 500 mL of a sodium bicarbonate buffer solution (1% w/v, pH~8.3).

UV/Vis spectrophotometry was employed to obtain absorbance curves of SAFC for each sample. Each sample was introduced into a UV/Vis spectrophotometer ($\lambda_{max}$=420 nm, from Hach, Loveland, Colo.) to measure absorbance. Calibration was performed by taking 1 mL calibration samples of each sample. After settling for a few hours, the calibration samples were filtered by using a 0.45 μm nylon syringe filter. The filtered calibration samples were introduced into the UV/Vis spectrophotometer to measure absorbance of free SAFC (that is, SAFC that is not contained in the aramide capsules) in solution. The absorbance spectrum of each sample was calibrated with the absorbance spectrum of the corresponding free SAFC calibration sample.

Figure 2:
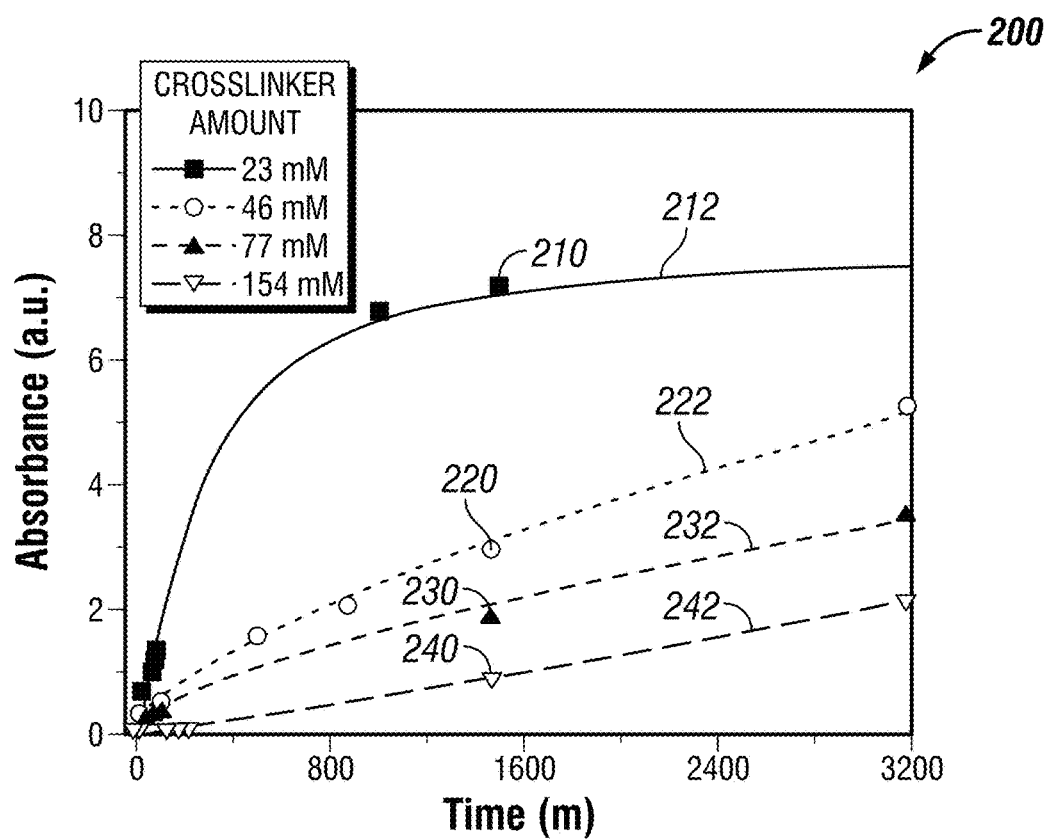
FIG. 2 is a graphical representation showing ultraviolet/visible (UV/Vis) absorbance of the encapsulant released from the aramide capsule samples over time.

The results were shown in FIG. 2. FIG. 2 is a graphical representation 200 showing UV/Vis absorbance of the encapsulant released from the aramide capsules over time. The horizontal axis represents time in minutes. The vertical axis represents UV/Vis absorbance in arbitrary units. Square points 210 and the corresponding regression curve 212 represent absorbance of Sample A in Example 1 having 23 mM of crosslinker. Circular points 220 and the corresponding regression curve 222 represent absorbance of Sample B in Example 1 having 46 mM of crosslinker. Triangular points 230 and the corresponding regression curve 232 represent absorbance of Sample C in Example 1 having 77 mM of crosslinker. Reverse-triangular points 240 and the corresponding regression curve 242 represent absorbance of Sample D in Example 1 having 154 mM of crosslinker.

FIG. 2 shows that the amount of dye that diffused into the supernatant was inversely dependent on the amount of the crosslinker. FIG. 2 also shows that the permeability, and as a result the release rate of the encapsulant, can be controlled by the amount of crosslinker added to the mixture. An increase in the concentration of the crosslinker resulted in a decrease in membrane permeability.

EXAMPLE 3

An aramide capsule was formed according to the methods described. The continuous solvent was a 4:1 cyclohexane-chloroform blend. The surfactant was a 1.5% by volume sorbitan trioleate (Span-85®, Sigma-Aldrich®, St. Louis, Mo.). The continuous phase included the continuous solvent and the surfactant. The crosslinker was 1,3,5-benzenetricarbonyl trichloride. The dispersed solvent was water. The dispersed monomer was 1,6-diaminohexane. The encapsulant was polyethylenimine (PEI). The dispersed phase included the dispersed solvent, the dispersed monomer, and the encapsulant.

The aramide capsules were prepared at room temperature. 25 mL of the continuous phase was added to 3 mL of the dispersed phase. The mixture was stirred for 15 minutes forming a w/o emulsion. After 15 minutes of stirring 40 mL of the crosslinker (0.02 M solution) was added to the mixture. For each sample, the crosslinker was added at a rate of about 1.5 mL per minute. Stirring continued while the crosslinker was being added. Stirring maintained the w/o emulsion.

After 30 minutes, polymerization was stopped by filtering the solid aramide capsules. The aramide capsules were washed with 500 mL of a sodium bicarbonate buffer solution (1% w/v, pH~8.3). The washed aramide capsules were vacuum dried in an oven.

Figure 3:
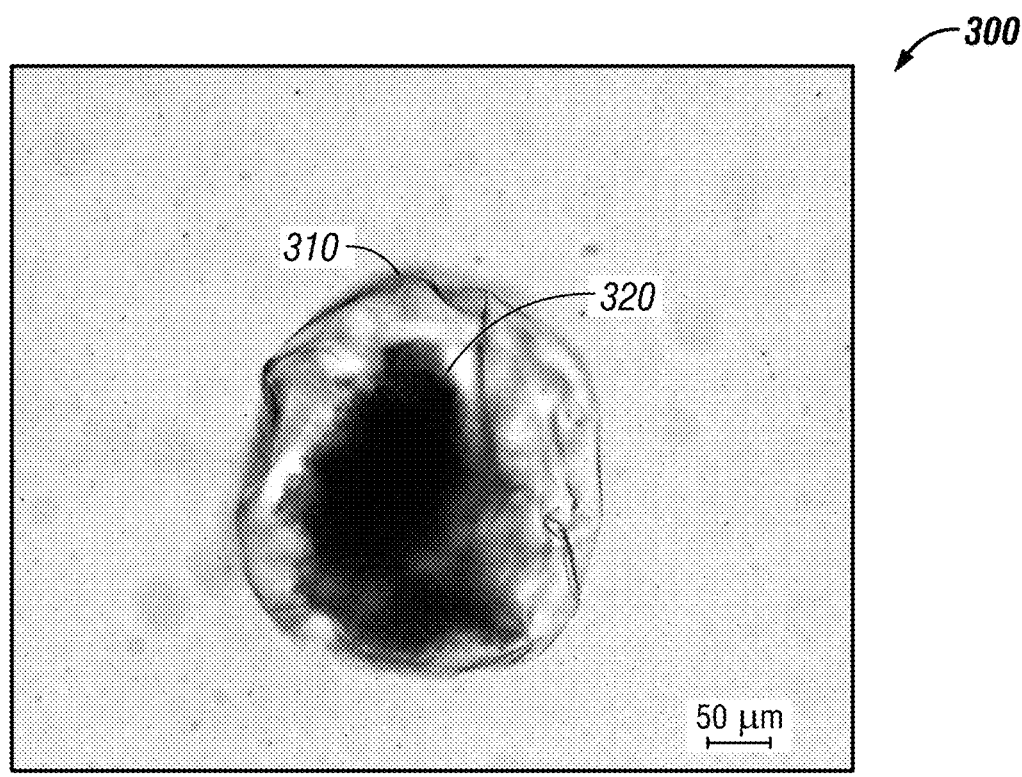
FIG. 3 is a photographic representation of the aramide capsule, as imaged by optical microscopy at ambient conditions.

The aramide capsules were placed onto a microscope slide and placed under an optical microscope with a mounted digital camera and a power source. FIG. 3 shows an optical micrograph image 300 of the aramide capsule 310 containing the PEI encapsulant 320.

EXAMPLE 4

A number of samples of aramide capsules were formed according to the methods described. The continuous solvent was a 4:1 cyclohexane-chloroform blend. The surfactant was a 1.5% by volume sorbitan trioleate (Span-85®, Sigma-Aldrich®, St. Louis, Mo.). The continuous phase included the continuous solvent and the surfactant. The crosslinker was 1,3,5-benzenetricarbonyl trichloride. The dispersed solvent was water. The dispersed monomer was 1,6-diaminohexane. The cement additive was the dispersant SAFC condensate. The dispersed phase included the dispersed solvent, the dispersed monomer, and the cement additive. SAFC has a red color, and so acted as a dye or a signaling molecule. The SAFC allowed measurements to be taken of the release rate from the aramide capsules.

The aramide capsules were prepared at room temperature. 25 mL of the continuous phase was added to 3 mL of the dispersed phase. The dispersed phase included 130 mM of the dispersed monomer. The dispersed phase included 0.5% bwoc of the SAFC encapsulant. The mixture was stirred for 15 minutes forming a w/o emulsion. After 15 minutes of stirring, the crosslinker in an amount in mM according to Table 2 was added to the mixture at a rate of about 1.5 mL per minute. Stirring continued while the crosslinker was being added. Stirring maintained the w/o emulsion.

TABLE 2

| Sample | Amount of Crosslinker (mM) | Amount of Dispersed Monomer (mM) | Amount of SAFC Encapsulant (% bwoc) |
| --- | --- | --- | --- |
| E | 16 | 130 | 0.5 |
| F | 50 | 130 | 0.5 |
| G | 65 | 130 | 0.5 |
| H | 82 | 130 | 0.5 |

Polymerization was stopped at a predetermined interval of about 24 hours where the w/o emulsion was filtered to produce the solid aramide capsules. The aramide capsules were washed with 500 mL of a borate buffer solution. The washed aramide capsules were vacuum dried producing a free flowing powder.

A cement slurry was formed having water, cement, and 3% bwoc of the aramide capsules. Any type of cement can be used in the cement slurry, including all Portland cements, any type of cement as classified by the American Society for Testing and Materials (ASTM), such as Type I, II, III, or V, and any type of cement as classified by the American Petroleum Institute (API), such as Class A, C, G, or H. Portland cements are described in API specification for "Materials and Testing for Well Cements," API 10B-2 of the API. Following API standards the slurry was blended at 4,000 revolutions per minute (rpm) for 15 seconds (s) and then increased to 12,000 rpm for 35 s. The slurry was placed in a rheometer (Anton Paar GmbH, Graz, Austria) to measure changes in viscosity over time.

Figure 4:
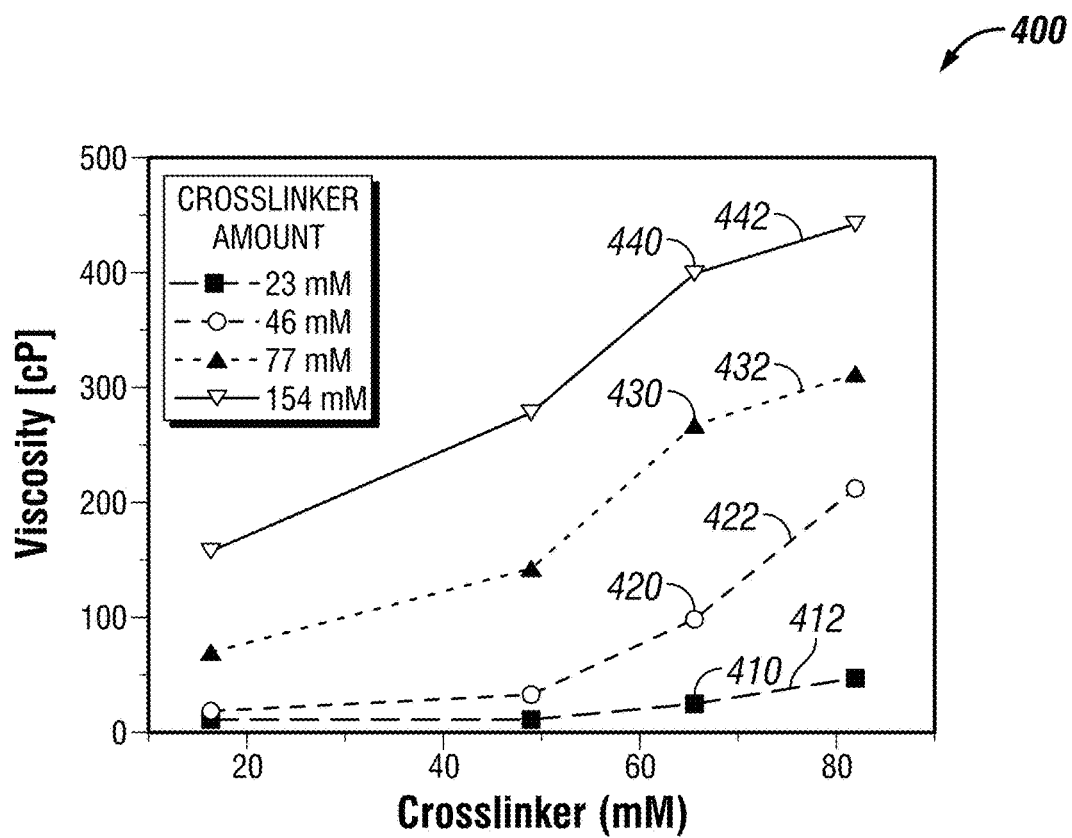
FIG. 4 is a graphical representation showing viscosity of the cement slurry having the encapsulant within the aramide capsule samples of varying monomer concentration.

The results were shown in FIG. 4. FIG. 4 is a graphical representation 400 showing viscosity of the cement slurry having the encapsulant within the aramide capsule samples of varying monomer concentration. The horizontal axis represents concentration of the crosslinker in mM. The vertical axis represents viscosity of the cement slurry in centipoise (cP). Square points 410 and the corresponding lines 412 represent viscosities of cement slurries having Samples E-G collected at 0 minutes of mixing the slurry. Circular points 420 and the corresponding lines 422 represent viscosities of cement slurries having Samples E-G collected at 10 minutes of mixing the slurry. Triangular points 430 and the corresponding lines 432 represent viscosities of cement slurries having Samples E-G collected at 20 minutes of mixing the slurry. Reverse-triangular points 440 and the corresponding lines 442 represent viscosities of cement slurries having Samples E-G collected at 30 minutes of mixing the slurry.

FIG. 4 shows that the viscosity of the cement slurry was dependent on the amount of the crosslinker. FIG. 4 also shows that the permeability, and as a result the release rate of the encapsulant, can be controlled by the amount of the crosslinker added to the mixture. An increase in the concentration of the crosslinker resulted in a decrease in membrane permeability.

EXAMPLE 5

A number of samples of aramide capsules were formed according to the methods described. The continuous solvent was a 4:1 cyclohexane-chloroform blend. The surfactant was a 1.5% by volume sorbitan trioleate (Span-85®, Sigma-Aldrich®, St. Louis, Mo.). The continuous phase included the continuous solvent and the surfactant. The crosslinker was 1,3,5-benzenetricarbonyl trichloride. The dispersed solvent was water. The dispersed monomer was 1,6-diamino-hexane. The cement additive was the dispersant SAFC. The dispersed phase included the dispersed solvent, the dispersed monomer, and the cement additive. SAFC has a red color, and so acted as a dye or a signaling molecule. The SAFC allowed measurements to be taken of the release rate from the aramide capsules.

The aramide capsules were prepared at room temperature. The dispersed phase included the dispersed monomer in an amount in mM according to Table 3. The dispersed phase included 0.5% bwoc of the SAFC encapsulant. The mixture was stirred for 15 minutes forming a w/o emulsion. After 15 minutes of stirring, the crosslinker in an amount in mM according to Table 3 was added to the mixture at a rate of about 1.5 mL per minute. Stirring continued while the crosslinker was being added. Stirring maintained the w/o emulsion.

TABLE 3

| Sample | Amount of Crosslinker (mM) | Amount of Dispersed Monomer (mM) | Amount of SAFC Encapsulant (% bwoc) |
|---|---|---|---|
| I (free dispersant, no capsules in cement) | 0 | 0 | 0.5 |
| J | 20 | 130 | 0.5 |
| K | 50 | 130 | 0.5 |
| L | 80 | 130 | 0.5 |

Polymerization was stopped at a predetermined interval of about 24 hours where the w/o emulsion was filtered to produce the solid aramide capsules. The aramide capsules were washed with 500 mL of a diethyl ether and borate buffer solution. The washed aramide capsules were vacuum dried.

A cement slurry was formed having water, cement, and 3% bwoc of the aramide capsules. In addition to the cement slurries having aramide capsules, a neat cement slurry was also formed having water and cement. Any type of cement can be used in the cement slurry, including all Portland cements, any type of cement as classified by ASTM, such as Type I, II, III, or V, and any type of cement as classified by API, such as Class A, C, G, or H. Portland cements are described in API specification for "Materials and Testing for Well Cements," API 10B-2 of the API. Following API standards the slurry was blended at 4,000 rpm for 15 s and then increased to 12,000 rpm for 35 s. The slurry was placed in a rheometer (Anton Paar GmbH, Graz, Austria) to measure changes in viscosity over time.

Figure 5:
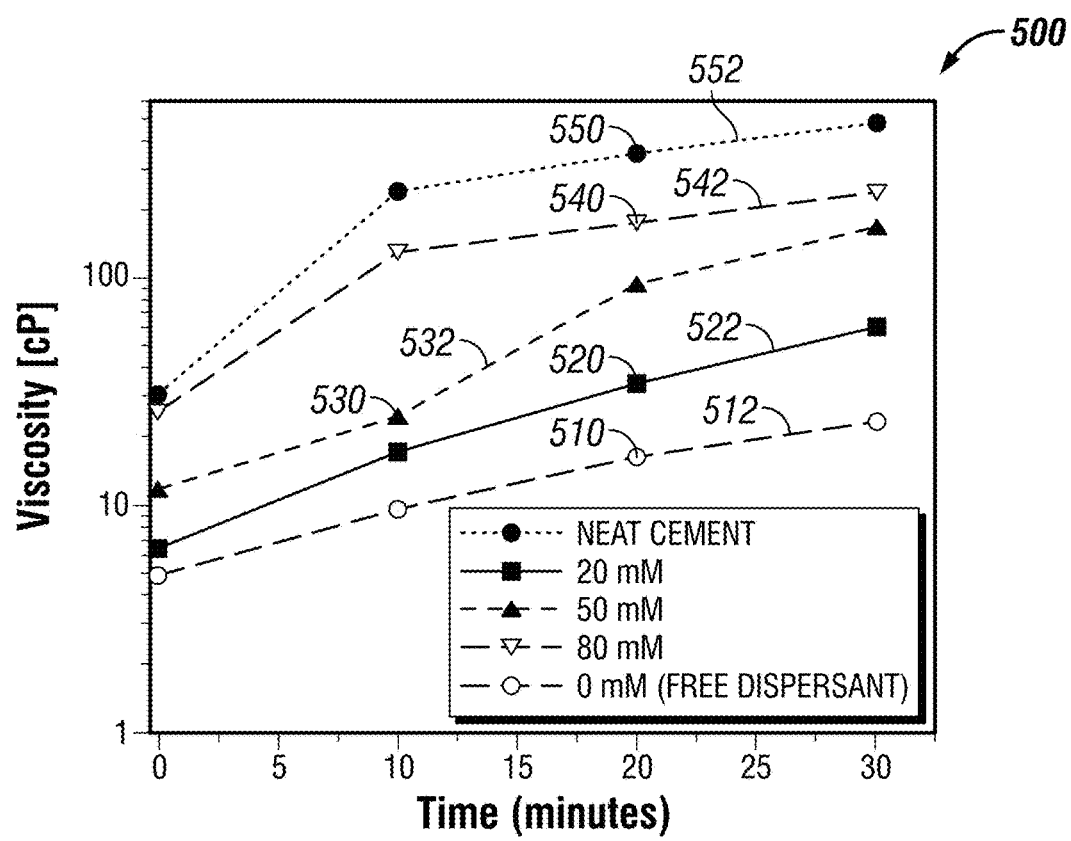
FIG. 5 is a graphical representation showing viscosity of the cement slurry having aramide capsule samples over time.

The results are shown in FIG. 5. FIG. 5 is a graphical representation 500 showing viscosity of the cement slurry having aramide capsule samples over time. The horizontal axis represents time in minutes. The vertical axis represents viscosity of the cement slurry in cP. Empty circular points 510 and the corresponding lines 512 represent viscosities of the cement slurry having Sample I over time. Square points 520 and the corresponding lines 522 represent viscosities of the cement slurry having Sample J over time. Triangular points 530 and the corresponding lines 532 represent viscosities of the cement slurry having Sample K over time. Reverse-triangular points 540 and the corresponding lines 542 represent viscosities of the cement slurry having Sample L over time. Filled circular points 550 and the corresponding lines 552 represent viscosities of the neat cement slurry over time.

FIG. 5 shows that the viscosity of the cement slurry was dependent on the amount of the crosslinker. FIG. 5 also shows that the permeability, and as a result the release rate of the encapsulant, can be controlled by the amount of the crossliner added to the mixture. An increase in the concentration of the crosslinker resulted in a decrease in membrane permeability.

EXAMPLE 6

A capsule-based cement having aramide capsules was prepared. Example aramide capsules include aramide capsules formed in Examples 1-5. A cement slurry was formed having water, cement, and 3% bwoc of the aramide capsules. Any type of cement can be used in the cement slurry, including all Portland cements, any type of cement as classified by ASTM, such as Type I, II, III, or V, and any type of cement as classified by API, such as Class A, C, G, or H. Portland cements are described in API specification for "Materials and Testing for Well Cements," API 10B-2 of the API. Following API standards the slurry was blended at 4,000 rpm for 15 s and then increased to 12,000 rpm for 35 s.

A neat cement was prepared. A cement slurry was formed having water and cement. Any type of cement can be used in the cement slurry, including all Portland cements, any type of cement as classified by ASTM, such as Type I, II, III, or V, and any type of cement as classified by API, such as Class A, C, G, or H. Portland cements are described in API specification for "Materials and Testing for Well Cements," API 10B-2 of the API. The slurry was blended at 4,000 rpm for 15 s, and blended at 12,000 rpm for 35 s.

A latex-based cement was prepared. A cement slurry was formed having water, cement, 6% bwoc of a 50% latex solution, and 15% by weight of the latex solution a stabilizer. Any type of cement can be used in the cement slurry, including all Portland cements, any type of cement as classified by ASTM, such as Type I, II, III, or V, and any type of cement as classified by API, such as Class A, C, G, or H. Portland cements are described in API specification for "Materials and Testing for Well Cements," API 10B-2 of the API. Example latexes include carboxylated latexes and carboxylated styrene-butadiene latexes. The slurry was blended at 1,000 rpm for 35 s.

After mixing, each slurry was poured into a sample holder of an ultrasonic cement analyzer (UCA, from Chandler Engineering, Broken Arrow, Okla.) for measuring confined compression strength. The UCA is suitable for curing cement slurries and conducting in situ testing of cements at wellbore conditions. Each slurry was then placed into a curing chamber to start the measurement, where the cement remained for a period of about 72 hours to about 120 hours at about 350 deg. F. and about 3,000 psi.

Figure 6:
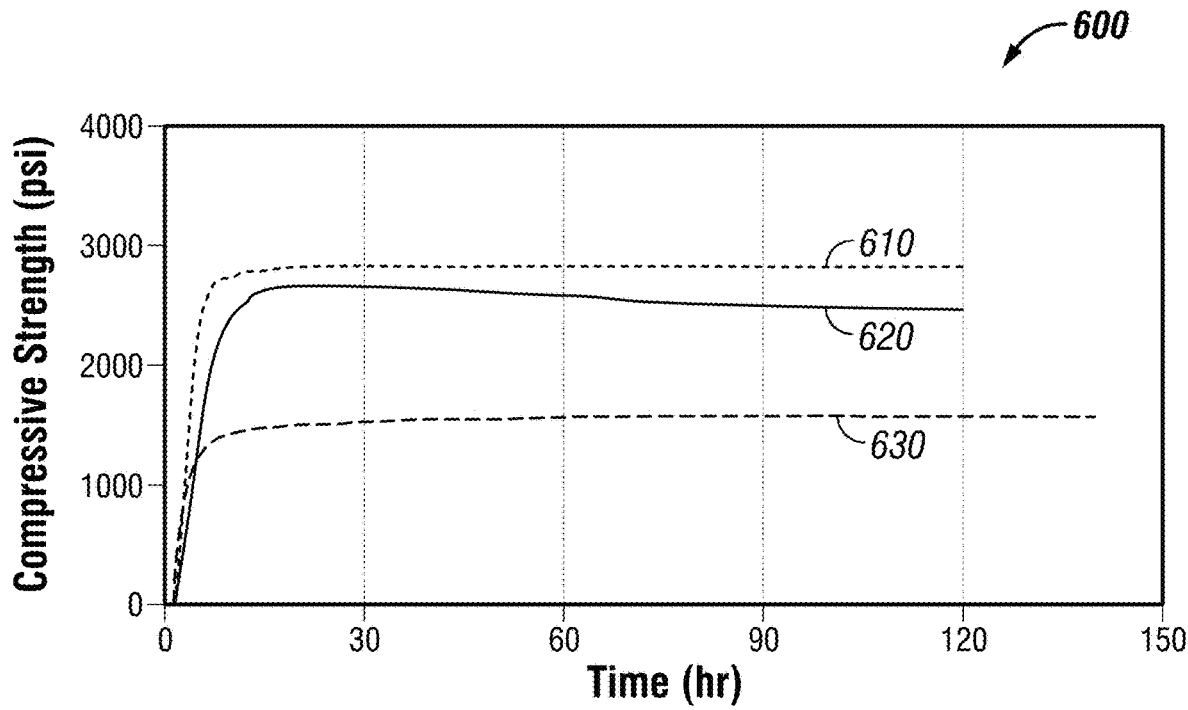
FIG. 6 is a graphical representation showing unconfined compression strengths of cement samples.

The results are shown in FIG. 6. FIG. 6 shows a graphical representation 600 of unconfined compression strengths of cement samples formed in Example 6. Graphical representations 610, 620, 630 correspond to the unconfined compression strengths of the neat cement, the aramide capsule-based cement, and the latex-based cement, respectively. The vertical axis represents the unconfined compression strength in psi. The horizontal axis represents time in hours. As shown in FIG. 6, the neat cement exhibits an unconfined compression strength ranging from about 3,500 psi to about 3,600 psi, at about 350 deg. F. for about 120 hours. The capsule-based cement exhibits an unconfined compression strength ranging from about 3,000 psi to about 3,400 psi, at about 350 deg. F. for about 120 hours. The latex-based cement exhibits an unconfined compression strength ranging from about 1,900 psi to about 2,200 psi, at about 350 deg. F. for about 120 hours.

FIG. 6 shows that cement strength retrogression occurs significantly for the latex-based cements compared to neat cement at wellbore conditions. On the other hand, cement strength retrogression does not significantly occur for the capsule-based cement, showing that the aramide capsules and the cement additives within the capsules provide structural integrity to the cement.

Although the embodiments have been described in detail, it should be understood that various changes, substitutions, and alterations can be made hereupon without departing from the principle and scope. Accordingly, the scope of the embodiments should be determined by the following claims and their appropriate legal equivalents.

There various elements described can be used in combination with all other elements described here unless otherwise indicated.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed here as from about one particular value to about another particular value and are inclusive unless otherwise indicated. When such a range is expressed, it is to be understood that another embodiment is from the one particular value to the other particular value, along with all combinations within said range.

As used here and in the appended claims, the words "comprise," "has," and "include" and all grammatical variations thereof are each intended to have an open, non-limiting meaning that does not exclude additional elements or steps.

What is claimed is:

1. A method for encapsulating a cement additive for use in a wellbore, the method comprising the steps of:
    mixing a continuous solvent and a surfactant to produce a continuous phase, where the surfactant includes a sorbitan ester;
    mixing a dispersed solvent, a dispersed monomer, and the cement additive to produce a dispersed phase, where the dispersed solvent and the continuous solvent are immiscible;
    mixing the continuous phase and the dispersed phase to form a mixture having an emulsion such that the dispersed phase is dispersed as droplets in the continuous phase, where an interface defines the droplets of the dispersed phase dispersed in the continuous phase;
    adding a crosslinker to the mixture;
    allowing an aramide polymer to form on the interface of the droplets, such that the aramide polymer forms a semi-permeable membrane around a core, where the core contains the dispersed phase, such that the semi-permeable membrane around the core forms an aramide capsule;
    allowing the aramide capsule to settle from the mixture; and
    separating the aramide capsule from the mixture using a separation method.

2. The method of claim 1, where the dispersed solvent is selected from the group consisting of water, ethanol, methanol, and combinations of the same.

3. The method of claim 1, where the dispersed monomer comprises an amine group.

4. The method of claim 3, where the dispersed monomer is selected from the group consisting of ethylenediamine, meta-phenylenediamine, para-phenylenediamine, hexamethylenediamine, and combinations of the same.

5. The method of claim 1, where the continuous solvent is selected from the group consisting of oil, mineral oil, cyclohexane, chloroform, and combinations of the same.

6. The method of claim 1, where the crosslinker is selected from the group consisting of 1,3,5-benzenetricarbonyl trichloride, sebacoyl chloride, and combinations of the same.

7. The method of claim 1, where the cement additive is water-soluble and is selected from the group consisting of sealing reagents, anti-gas migration additives, high-temperature retarders, fluid-loss additives, accelerators, superplasticizers, and combinations of the same.

8. The method of claim 1, where the surfactant is sorbitan trioleate.

9. The method of claim 1, where the cement additive is selected from the group consisting of: sulfonated acetone-formaldehyde condensate, polyethylenimine, and combinations of the same.

10. The method of claim 1, further comprising the step of:
    allowing the cement additive to permeate from the core to outside the aramide capsule through the semi-permeable membrane.

* * * * *